(12) United States Patent
Vieta

(10) Patent No.: US 8,581,879 B2
(45) Date of Patent: Nov. 12, 2013

(54) NEGATIVE PIXEL COMPENSATION

(75) Inventor: William Matthew Vieta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 643 days.

(21) Appl. No.: 12/691,328

(22) Filed: Jan. 21, 2010

(65) Prior Publication Data
US 2011/0175823 A1    Jul. 21, 2011

(51) Int. Cl.
*G06F 3/045* (2006.01)
*G06F 3/041* (2006.01)
*G06F 3/044* (2006.01)
*G08C 21/00* (2006.01)

(52) U.S. Cl.
USPC .................. 345/174; 345/173; 178/18.06

(58) Field of Classification Search
USPC .............. 345/156–184; 178/18.01–20.04
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,482,544 B2 * | 7/2013 | Land et al. | 345/173 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0158145 A1* | 7/2008 | Westerman | 345/156 |
| 2008/0170042 A1 | 7/2008 | Yoon et al. | |
| 2008/0309622 A1* | 12/2008 | Krah | 345/173 |
| 2009/0032312 A1* | 2/2009 | Huang et al. | 178/18.06 |
| 2009/0160787 A1 | 6/2009 | Westerman et al. | |

FOREIGN PATENT DOCUMENTS

| | | |
|---|---|---|
| EP | 1 741 476 A1 | 1/2007 |
| JP | 2000-163031 A | 6/2000 |
| JP | 2002-342033 A | 11/2002 |
| WO | WO-2011/090514 A1 | 7/2011 |

OTHER PUBLICATIONS

U.S. Appl. No. 12/500,870, filed Jul. 10, 2009, by Land et al.

(Continued)

*Primary Examiner* — Bipin Shalwala
*Assistant Examiner* — Ryan A Lubit
(74) *Attorney, Agent, or Firm* — Morrison & Foerster LLP

(57) ABSTRACT

Negative pixel compensation in a touch sensor panel is disclosed. A method can compensate for a negative pixel effect in touch signal outputs due to poor grounding of an object touching the panel. To do so, the method can include determining at least one bound for a negative pixel compensation factor based on touch signal values, estimating the compensation factor within the determined bound based on the touch signal values that are negative, where the negative values indicate the presence of the negative pixel effect, and applying the estimated compensation factor to the touch signal outputs to compensate the touch signal values for the negative pixel effect.

13 Claims, 12 Drawing Sheets

(56) References Cited

OTHER PUBLICATIONS

International Search Report mailed Dec. 7, 2010, for PCT Application No. PCT/US2010/049001, filed Sep. 15, 2010, four pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

NEGATIVE PIXEL COMPENSATION

FIELD

This relates generally to touch sensitive devices and, more particularly, to compensating for negative pixel effects on touch sensitive devices.

BACKGROUND

Many types of input devices are presently available for performing operations in a computing system, such as buttons or keys, mice, trackballs, joysticks, touch sensor panels, touch screens and the like. Touch sensitive devices, and touch screens in particular, are becoming increasingly popular because of their ease and versatility of operation as well as their declining price. A touch sensitive device can include a touch sensor panel, which can be a clear panel with a touch-sensitive surface, and a display device such as a liquid crystal display (LCD) that can be positioned partially or fully behind the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

When the object touching the touch sensor panel is poorly grounded, touch output values indicative of a touch event can be erroneous or otherwise distorted. The possibility of such erroneous or distorted values can further increase when two or more simultaneous touch events occur at the touch sensor panel.

SUMMARY

This relates to compensating touch signals indicative of a touch at a touch sensor panel for errors that can be caused by poor grounding of a user or other objects touching the panel. One such error can be a negative pixel effect, in which an apparent negative amount of touch and/or a reduced positive amount of touch can be sensed by the panel during multiple simultaneous touches. A method to compensate for this effect can include determining at least one bound for a compensation factor based on touch signal values, estimating the compensation factor within the determined bound based on the touch signal values that are negative, where the negative touch signals can be indicative of the effect, and applying the estimated compensation factor to the touch signals to compensate the touch signals.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to compensating for a negative pixel effect in a touch sensor panel due to poor grounding of a user or other objects touching the panel. A compensation method can include determining at least one bound for a negative pixel compensation factor based on touch signal values, estimating the compensation factor within the determined bound based on the touch signal values that are negative, where the negative signal values indicate the negative pixel effect, and applying the estimated compensation factor to the touch signals to compensate the touch signal values for the negative pixel effect.

The ability to measure a negative pixel effect in a touch sensor panel can advantageously provide more accurate and faster touch detection, as well as power savings, by not having to repeat measurements subject to poor grounding conditions. Additionally, the panel can more robustly adapt to various grounding conditions of a user or other object.

The terms "poorly grounded," "ungrounded," "not grounded," "not well grounded," "improperly grounded," "isolated," and "floating" can be used interchangeably to refer to poor grounding conditions that can exist when an object is not making a low impedance electrical coupling to the ground of the touch sensor panel.

The terms "grounded," "properly grounded," and "well grounded" can be used interchangeably to refer to good grounding conditions that can exist when an object is making a low impedance electrical coupling to the ground of the touch sensor panel.

Touch sensor panels described and illustrated herein can include configurations in which conductive drive and sense lines (to be described below) can be formed on opposite sides of a substrate, on the same side of a substrate, on the same layer on the same side of a substrate, on different substrates, or the like. Although the touch sensor panels described and illustrated herein have the drive and sense lines formed in rows and columns orthogonal to each other, it should be understood that other geometric configurations are also possible, such as concentric and radial lines of a polar-coordinate configuration, diagonal lines of an oblique configuration, non-orthogonal lines, and the like.

Figure 1:
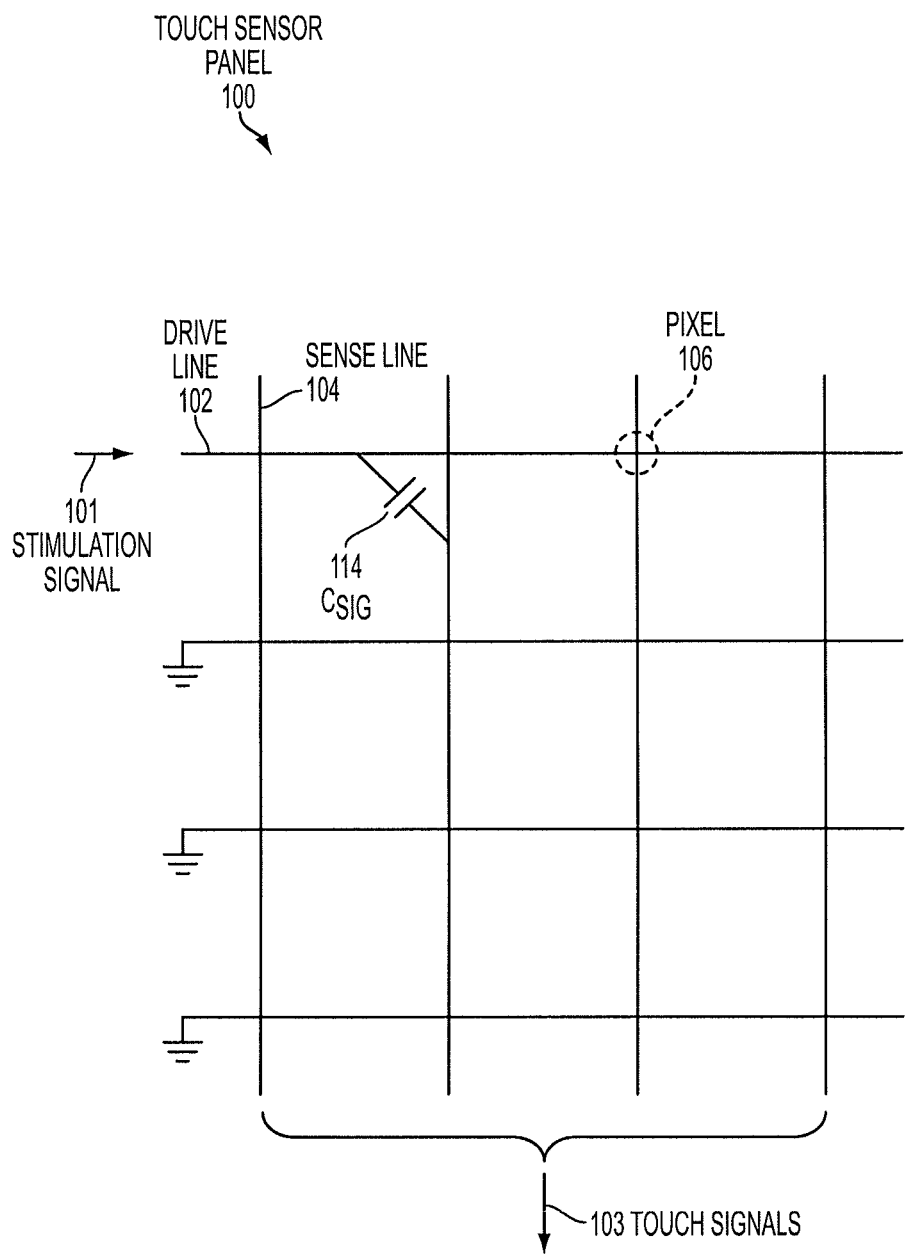
FIG. 1 illustrates an exemplary touch operation of a touch sensor panel according to various embodiments.

FIG. 1 illustrates an exemplary touch operation of a touch sensor panel according to various embodiments. In the example of FIG. 1, touch sensor panel 100 can include an array of pixels 106 that can be formed at the crossing points of row lines 102 and column lines 104, although it should be understood that other pixel configurations can be employed, such as drive and sense areas adjacent to each other on a single layer of the panel. Each pixel 106 can have an associated mutual capacitance Csig 114 formed between the crossing row lines 102 and column lines 104. As illustrated in FIG. 1, the row lines 102 can function as drive lines and the column lines 104 can function as sense lines, where the drive lines can be stimulated by stimulation signals 101 provided by drive circuitry (not shown) that can include an alternating current (AC) waveform and the sense lines can transmit touch or sense signals 103, indicative of a touch at the panel 100, to sense circuitry (not shown) that can include a sense amplifier for each sense line.

To sense a touch at the panel 100, in some embodiments, multiple drive lines 102 can be substantially simultaneously stimulated by the stimulation signals 101 to capacitively couple with the crossing sense lines 104, thereby forming a capacitive path for coupling charge from the drive line to the sense line. The crossing sense lines 104 can output signals representing the coupled charge or current. While some drive lines 102 are being stimulated, the other drive lines can be coupled to ground or other DC level. In other embodiments, each drive line 102 can be sequentially stimulated by the stimulation signals 101 to capacitively couple with the crossing sense lines 104, which can output signals representing the coupled charge or current, while the other drive lines can be coupled to ground or other DC level. In still other embodiments, there can be a combination of multiple drive lines 102 being substantially simultaneously stimulated and single drive lines being sequentially stimulated.

When a well grounded user's finger (or other object) touches the panel 100, the finger can cause the capacitance Csig 114 to reduce by an amount $\Delta$Csig at the touch location. This capacitance change $\Delta$Csig can be caused by charge or current from the stimulated drive line 102 being shunted through the touching finger to ground rather than being coupled to the crossing sense line 104 at the touch location. The touch signals 103 representative of the capacitance change $\Delta$Csig can be transmitted by the sense lines 104 to the sense circuitry for processing. The touch signals 103 can indicate the pixel where the touch occurred and the amount of touch that occurred at that pixel location.

When a poorly grounded user's finger (or other object) touches the panel 100, a finger capacitance Cfd to the stimulated drive line 102, a finger capacitance Cfs to the crossing sense line 104 at the touch location, and a finger capacitance Cgnd to user ground can form a secondary capacitive path for coupling charge from the drive line to the sense line. Some of the charge generated by the stimulated drive line 102 and transmitted through the finger can be coupled via the secondary capacitive path back into the crossing sense line 104, rather than to ground. As a result, instead of the capacitance Csig 114 of the pixel at the touch location being reduced by $\Delta$Csig, Csig may only be reduced by ($\Delta$Csig−Cneg), where Cneg can represent a so-called "negative capacitance" resulting from the charge coupled into the crossing sense line due to the finger's poor grounding. The touch signals 103 can still generally indicate the pixel where the touch occurred but with an indication of a lesser amount of touch than actually occurred.

When multiple poorly grounded user's fingers (or other objects) simultaneously touch the panel 100 at different locations, the first finger capacitances Cfd and Cfs can form as described above at the first finger's touch location, i.e., a crossing of a stimulated drive line 102 and a sense line 104. Some of the charge from the first finger can also be coupled through the second finger back into the panel 100 so that the second finger capacitances Cfd and Cfs can form at the second finger's touch location, i.e., at a crossing of an unstimulated drive line 102 and a sense line 104. The capacitance to user ground Cgnd can also form as described above. As a result, the touch signals 103 can indicate the pixel where the first finger touched but with an indication of a lesser amount of touch than actually occurred, as described previously. The touch signals 103 can also indicate a phantom touch at the pixel formed by the crossing of the stimulated drive line 102 and the second finger's sense line 104 and/or at the pixel formed by the crossing of the second finger's unstimulated drive line and the first finger's sense line. The touch signals 103 can indicate an apparent negative amount of touch at these pixels, due to the charge coupled back into the panel by the second finger. This can be the so-called "negative pixel effect."

Similarly, when the drive line 102 at the touch location of the second finger is stimulated, the second finger capacitances Cfd and Cfs can form as described above at that touch location. Some of the charge from the second finger can also be coupled through the first finger back into the panel 100 so that the first finger capacitances Cfd and Cfs can form at the first finger's touch location, i.e., at the crossing of its now unstimulated drive line 102 and a sense line 104. The capacitance to user ground Cgnd can also form. As a result, the touch signals 103 can indicate the pixel where the second finger touched but with an indication of a lesser amount of touch than actually occurred, as described previously. The touch signals 103 can also indicate a phantom touch at the pixel formed by the crossing of the stimulated drive line 102 and the first finger's sense line 104 and/or at the pixel formed by the crossing of the first finger's unstimulated drive line and the second finger's sense line and an apparent negative amount of touch at these pixels, due to the charge coupled back into the panel 100 by the first finger, thereby generating the negative pixel effect.

Figure 2:
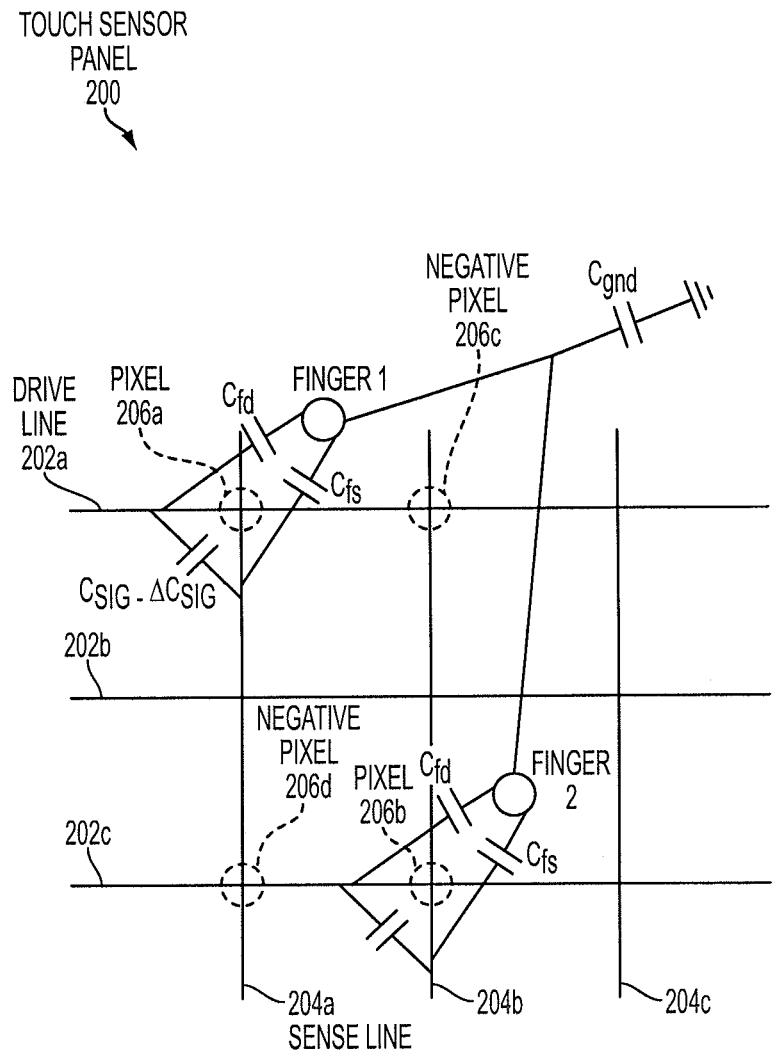
FIG. 2 illustrates an exemplary negative pixel effect in a touch sensor panel receiving multiple simultaneous touches of poorly grounded fingers according to various embodiments.

FIG. 2 illustrates an exemplary negative pixel effect in a touch sensor panel receiving multiple simultaneous touches of poorly grounded fingers according to various embodiments. As illustrated in FIG. 2, the row lines 202 can function as drive lines and the column lines 204 can function as sense lines. In the example of FIG. 2, a poorly grounded first finger (symbolically illustrated by a circle and identified as "finger 1") can touch at pixel 206a of touch sensor panel 200 and a poorly grounded second finger (symbolically illustrated by a circle and identified as "finger 2") can touch at pixel 206b of the panel. When drive (or row) line 202a of the panel 200 is stimulated, the capacitance along a first path between the drive line 202a and sense (or column) line 204a can be (Csig−ΔCsig). Because the fingers are poorly grounded, a second capacitive path can form between the drive line 202a and the sense line 204a, having capacitances Cfd (between the drive line 202a and the first finger) and Cfs (between the sense line 204a and the first finger), and a third capacitive path can form via the second finger between the drive line 202c and the sense line 204b, having capacitances Cfd (between the drive line 202c and the second finger) and Cfs (between the sense line 204b and the second finger). A capacitance Cgnd can also form between the fingers and user ground. The capacitances can be due to charge or current acquired by the first finger from the stimulated drive line 202a being coupled back into the panel 200 at pixels 206a and 206b, rather than being shunted to ground. Similar capacitances can form at the first and second fingers when drive line 202c is stimulated. As a result, pixels 206c and 206d, which are proximate to the touched pixels 206a and 206b but did not receive touches, can indicate a negative amount of touch ("negative pixels").

Accordingly, detecting the negative pixel effect and compensating the touch signals for the effect can improve touch sensing of the touch sensor panel in poor grounding conditions.

Some approaches to compensate for negative pixel effect have iteratively processed the touch signals until the effect has been compensated for. However, such approaches can be computationally expensive and time consuming. A faster and less computationally expensive approach can be desirable in some circumstances. This can be accomplished, according to various embodiments, by determining a factor (or parameter) representative of the negative pixel effect and using that factor to compensate for the effect in touch signals, as described below.

Compensation for the negative pixel effect can be approximately expressed in terms of the relationship between measured touch image Im (the image captured by the touch sensor panel and subject to negative pixel effect) and original touch image I (the image as it should have been without the negative pixel effect) as follows, $$I = I_m + R \times f(I_m) \quad (1)$$

where R=a negative pixel compensation factor, which can be a function of Cfd, Cfs, Cgnd, and panel design constants, thereby representative of a grounding condition; and f(Im)=a correction image expressed in terms of the measured image Im touch signals along the drive (row) lines and the sense (column) lines as follows, $$f(I_m) = \Sigma I_{m,row} \times \Sigma I_{m,col} \quad (2)$$

where $\Sigma I_{m,row}$=the sum of measured touch signals along a drive (row) line; and $\Sigma I_{m,col}$=the sum of measured touch signals along a sense (column) line. The measured touch signal Im can be a measurement of the change in capacitance ΔCsig, as described above.

For each pixel, Equation (1) can be expressed as follows, $$I(i,j) = I_m(i,j) + R \times \sum_{all\_j} I_m(i,j) \times \sum_{all\_i} I_m(i,j) \quad (3)$$

where (i, j)=the location of the pixel formed by the crossing of drive (row) line i and sense (column) line j in the touch sensor panel;

$$\sum_{all\_j} I_m(i,j) = \text{the sum of measured touch signals along drive line } i;$$

$$\text{and} \sum_{all\_i} I_m(i,j) =$$

the sum of measured touch signals along sense line j.

Equation (1) shows that the original image I can be restored by compensating the measured image Im with the compensation term R×f(Im), thereby reducing or eliminating the negative pixel effect. Therefore, by estimating an appropriate negative pixel compensation factor R and applying the factor to a measured touch image, the negative pixel effect can be compensated for in the measured image in accordance with various embodiments. Although Equation (1) expresses a linear compensation, it is to be understood that nonlinear compensation is also possible.

Figure 3:
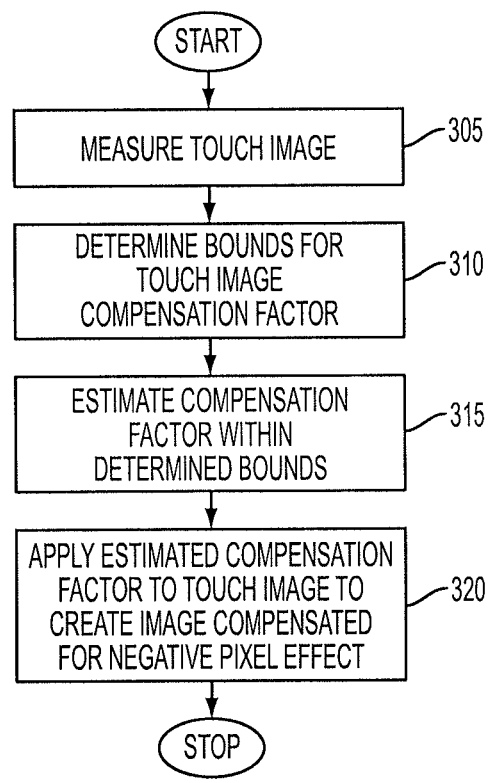
FIG. 3 illustrates an exemplary method for compensating for negative pixel effect in a touch sensor panel according to various embodiments.

FIG. 3 illustrates an exemplary method for compensating for negative pixel effect in a touch sensor panel according to various embodiments. In the example of FIG. 3, touch signals from pixels of a touch sensor panel can be measured to provide a touch image Im (305). In some embodiments, the capacitance Csig1 at each pixel when there is no touch can be compared to the capacitance Csig2 determined at the pixel when there is a touch, such that the capacitance change ΔCsig=Csig1−Csig2 can make up the touch signal measurements. The capacitance Csig1 can indicate a background capacitance that can be determined either prior to operation or periodically during operation of the panel. Bounds within which the negative pixel compensation factor R is expected to fall, based on characteristics of the measured touch image Im and the touch sensor panel, can be determined so as to ensure that the factor R to be estimated later is a reasonable estimate (310). The negative pixel compensation factor R can then be estimated within the determined bounds (315). The estimated negative pixel compensation factor R can be applied to the measured touch image Im, for example, using Equation (1), to restore the original image I without the negative pixel effect (320). This method will be described in more detail below.

Some touch sensor panels, in particular larger panels, can introduce appreciable noise into the measured touch image, which can adversely affect the negative pixel compensation. Accordingly, the measured touch image can be preprocessed to reduce the noise before performing negative pixel compensation, as in FIG. 4, for example.

Figure 4:
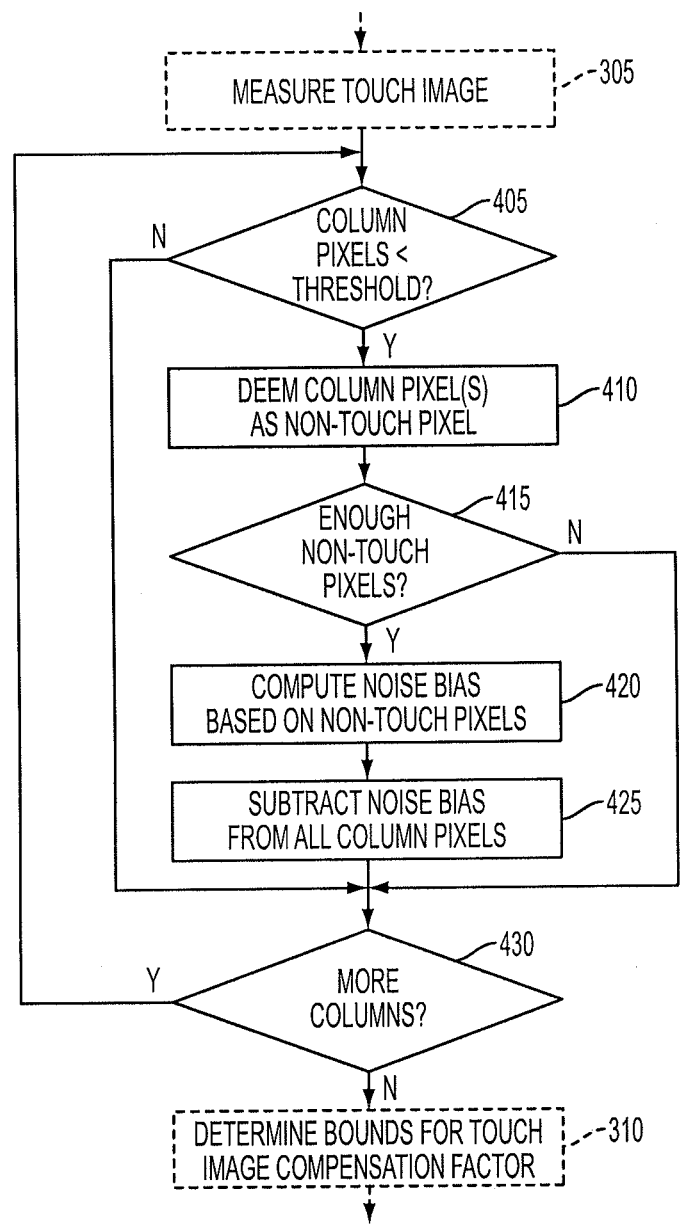
FIG. 4 illustrates an exemplary bias noise calculation that can be included in an exemplary method for compensating for negative pixel effect in a touch sensor panel according to various embodiments.

FIG. 4 illustrates an exemplary bias noise calculation that can be included in an exemplary method for compensating for negative pixel effect in a touch sensor panel according to various embodiments. In the example of FIG. 4, after the touch image Im has been measured (305), the noise bias can be subtracted from the measured image. To do so, a determination can be made whether touch signals from pixels along a sense (or column) line of the touch sensor panel are less than a predetermined noise threshold (405). The noise threshold can be predetermined as follows. The touch signals can be measured when there are no touches at the touch sensor panel. In a noiseless touch image, the touch signal values should be at approximately zero, indicating no touches. However, in a noisy touch image, when there are no touches, the touch signal values can be non-zero, indicating the noise bias in the panel. The mean value of the touch signals can be calculated and the noise threshold can be set to this mean value. Since the noise bias is generally a function of the touch sensor panel design and somewhat static, the noise threshold can be calculated prior to operation of the panel and, if desired, updated occasionally during panel operation. If the touch signals are less than the threshold, the touch signals can be deemed non-touches and indicative of noise in the panel (410).

A determination can be made whether there are enough non-touch signals to calculate a reasonable noise bias (415). In some embodiments, the number of non-touch signals can be compared to a minimum amount and, if greater than the minimum, sufficient to calculate the noise bias. The minimum amount can be determined empirically based on panel operation, design, and the like, for example. The noise bias can be calculated from the non-touch signals (420). In some embodiments, the noise bias can be calculated as the average of the non-touch signals. In some embodiments, the noise bias can be calculated as the median of the non-touch signals. Other techniques are also possible for calculating the noise bias from the non-touch signals. The calculated noise bias can be subtracted from all the touch signals in that sense (or column) line (425).

The method can be repeated for each sense line to subtract the noise bias from all the touch signals in that sense line (430).

After the noise bias is subtracted from the touch signals, the noise-reduced measured image Im can then be used to determine the negative pixel compensation factor R bounds and the method of FIG. 3 can proceed as described above (310).

Figure 5:
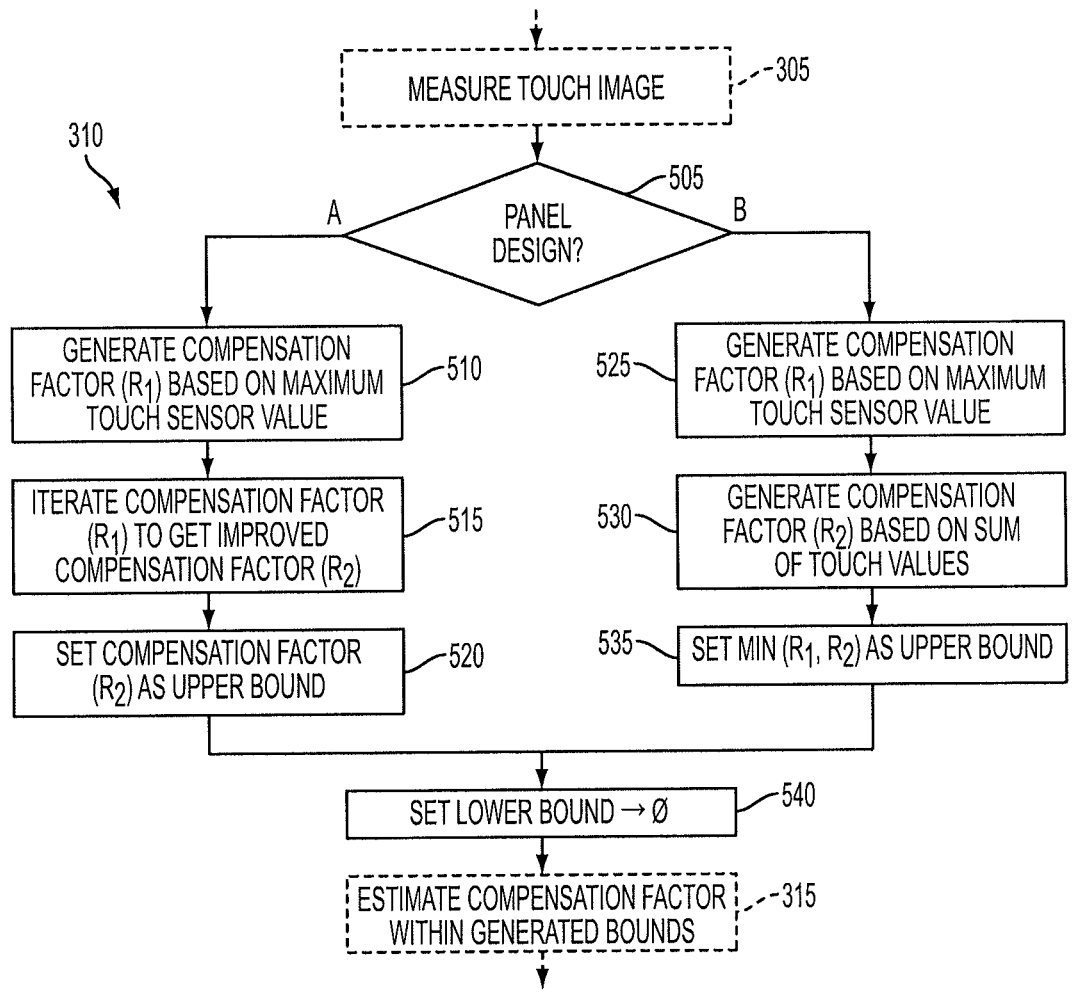
FIG. 5 illustrates an exemplary determination of compensation factor bounds that can be included in an exemplary method for compensating for negative pixel effect in a touch sensor panel according to various embodiments.

FIG. 5 illustrates an exemplary determination of compensation factor bounds that can be included in an exemplary method for compensating for negative pixel effect in a touch sensor panel according to various embodiments. In the example of FIG. 5, after the touch image Im has been measured (305), bounds of the negative pixel compensation factor R can be determined (310). Depending on the touch sensor panel design, negative pixel compensation according to Equation (1) may or may not apply very well. How well can be a function of the panel size, wiring, pixel layout, pixel proximity, and the like. As such, for the panel design for which Equation (1) does not apply well (designated "A" in FIG. 5), the method can determine the bounds in one way. For the panel design for which Equation (1) does apply well (designated "B" in FIG. 5), the method can determine the bounds in another way. Larger panels can generally be, though not always, in the "A" design category; whereas, smaller panels can generally be, though not always, in the "B" design category.

A determination can be made about the touch sensor panel design for which the bounds are to be determined (505). If the panel design falls in the "A" category, an upper bound negative pixel compensation factor R1 can be generated based on the maximum touch signal that can be sensed or attained by the touch sensor panel Smax (510). This can be done by choosing the maximum touch signal value in the measured touch image Im and using Equation (1) to determine a maximum compensation factor R that would give a corrected touch signal value in the original touch image I of the chosen maximum touch signal value Smax. This maximum compensation factor R can be set to the upper bound factor R1. This assumes that the position of the maximum touch signal value in the measured touch image Im and the position of the maximum touch signal value in the original touch image I are about the same, which may or may not apply in some instances. This also assumes that the value achieved by the maximum touch signal in the measured touch image Im has value Smax in the original image, which may or may not apply in some instances. Where this assumption may apply, the negative pixel compensation factor R can be equal to the upper bound factor R1. However, where this assumption may not apply, the value of the maximum touch signal in the original touch image I can be less than Smax, such that the negative pixel compensation factor R can be less than the upper bound factor R1.

The upper bound factor R1 can be iterated for fine tuning to provide an improved or tighter upper bound factor R2 (515). This can be done because the factor R1 may not be as precise as preferred due to Equation (1) not being entirely applicable to this panel design. To calculate the upper bound factor R2, the measured image Im, the correction image f(Im), and the upper bound factor R1 can be applied in Equation (1) to calculate an image In generated using the factor R1. The position Pr1 of the maximum touch signal value in the image In can be chosen. Using Equation (1), a maximum compensation factor R can be determined based on the touch signal value in the measured image Im at the position Pr1, the maximum panel touch signal value Smax, and the corresponding correction image f(Im). This maximum compensation factor R can be set to the upper bound factor R2. Further iterations can be done to improve or tighten the upper bound factor even more. Preferably, the number of iterations can be few for efficiency. The upper bound of the negative pixel compensation factor can be set as the factor R2 (520).

If the panel design falls in the "B" category, an upper bound negative pixel compensation factor R1 can be generated based on the maximum touch signals that can be sensed by the touch sensor panel (525). This can be done by choosing the maximum touch signal value in the measured touch image Im and using Equation (1) to determine a maximum compensation factor R that would give a corrected touch signal value in the original touch image I of the chosen maximum touch signal value in the measured image Im. This maximum compensation factor R can be set to the upper bound factor R1.

Another upper bound negative pixel compensation factor R2 can be generated based on the sum of the pixel values in the original touch image I (530). This can be done by estimating an upper bound factor R2 as follows.

$$R = \frac{a \times (G + C_{gnd,scl})}{((1-a) \times G + C_{gnd,scl})^2} \quad (4)$$

where $$C_{gnd,scl} = \frac{C_{gnd}}{b},$$

a ground capacitance scaled by constant b; $G = \Sigma I$, a sum of the corrected touch image values in the original touch image I; and a, b=touch sensor panel design constants, which can be obtained through simulation and/or empirical measurements for a given panel sensing pattern design. The constants a, b can be determined prior to operation of the panel.

To calculate the upper bound negative pixel compensation factor R2 using Equation (4), a "worst case" Cgnd,scl value can be chosen, indicative of a poorest grounding condition, for example. This value can be determined by experimentation or estimated based on observation of panel operation. Since the original image I has not yet been calculated at this point, the value of G can be estimated as either the sum of the absolute values of the touch signals in the measured touch signal image Im or the sum of the touch signals having positive values in the measured image Im. The chosen Cgnd,scl value and the estimated G value can be applied to Equation (4) to calculate a compensation factor. This calculated compensation factor can be set to the upper bound factor R2. The upper bound of the negative pixel compensation factor can be set as the minimum of the two upper bound factors R1 and R2 (535).

The lower bound of the negative pixel compensation factor can be set to zero or some value substantially close to zero (540). The negative pixel compensation factor R can then be estimated within the determined upper and lower bounds and the method of FIG. 3 can proceed as described above (315).

Figure 6:
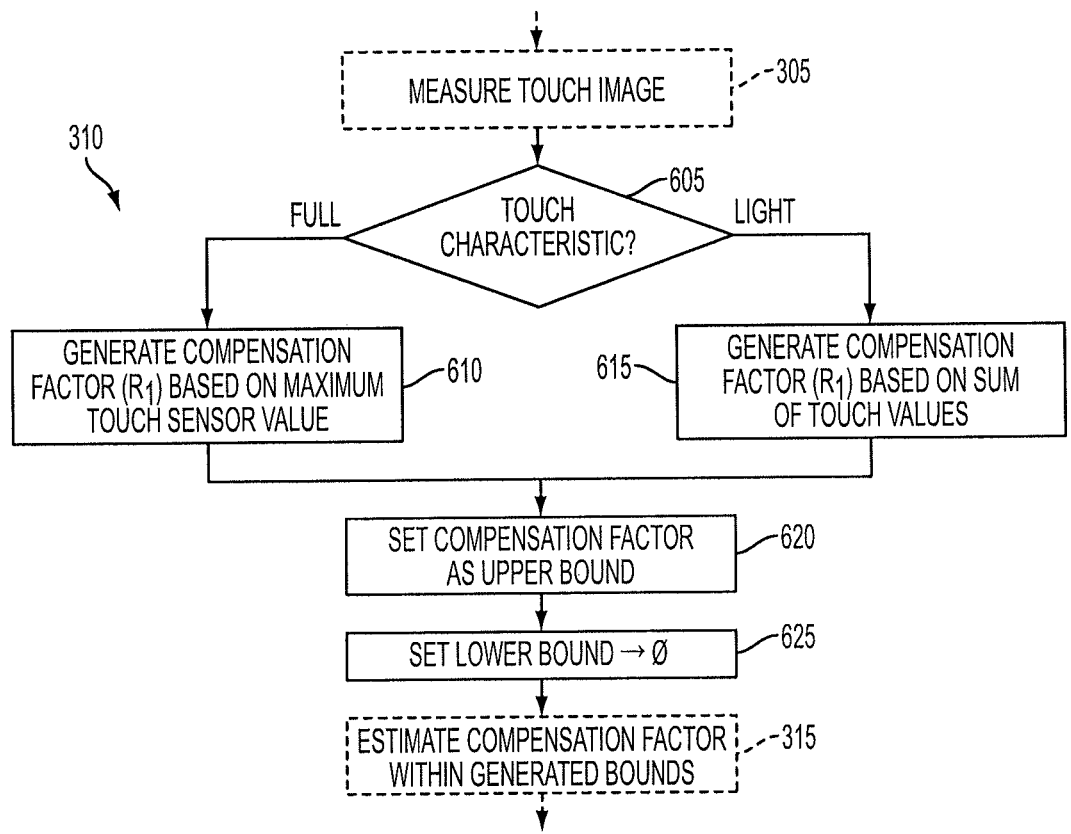
FIG. 6 illustrates another exemplary determination of compensation factor bounds that can be included in an exemplary method for compensating for negative pixel effect in a touch sensor panel according to various embodiments.

FIG. 6 illustrates another exemplary determination of compensation factor bounds that can be included in an exemplary method for compensating for negative pixel effect in a touch sensor panel according to various embodiments. In the example of FIG. 6, after the touch image Im has been measured (305), bounds of the negative pixel compensation factor R can be determined (310). Characteristics of a touch, e.g., touch strength, on the touch sensor panel can impact the negative pixel compensation. A full touch at the touch sensor panel can generate touch values in the measured touch image Im that should be close to the maximum touch signals that can be sensed by the panel. As such, the maximum touch signals may be an appropriate metric for determining the compensation factor for a full touch; whereas, a light touch at the touch sensor panel can generate touch values that are much lower, which, compared to the maximum touch signals, can erroneously indicate significant negative pixel effect requiring significant compensation. As such, the sum of the pixel values may be a more appropriate metric for determining the compensation factor for a light touch.

A determination can be made whether a touch at the touch sensor panel is a full touch or a light touch (605). For a full touch, an upper bound negative pixel compensation factor R1 can be generated based on the maximum touch signals that can be sensed by the touch sensor panel (610). This can be done as described above. For a light touch, an upper bound negative pixel compensation factor R1 can be generated based on the sum of the pixel values calculated in the original touch image I(615). This can be done as described above.

The upper bound of the negative pixel compensation factor can be set to the factor R1 (620). The lower bound of the negative pixel compensation factor can be set to zero or a value substantially close to zero (625). The negative pixel compensation factor R can then be estimated within the determined upper and lower bounds and the method of FIG. 3 can proceed as described above (315).

Figure 7:
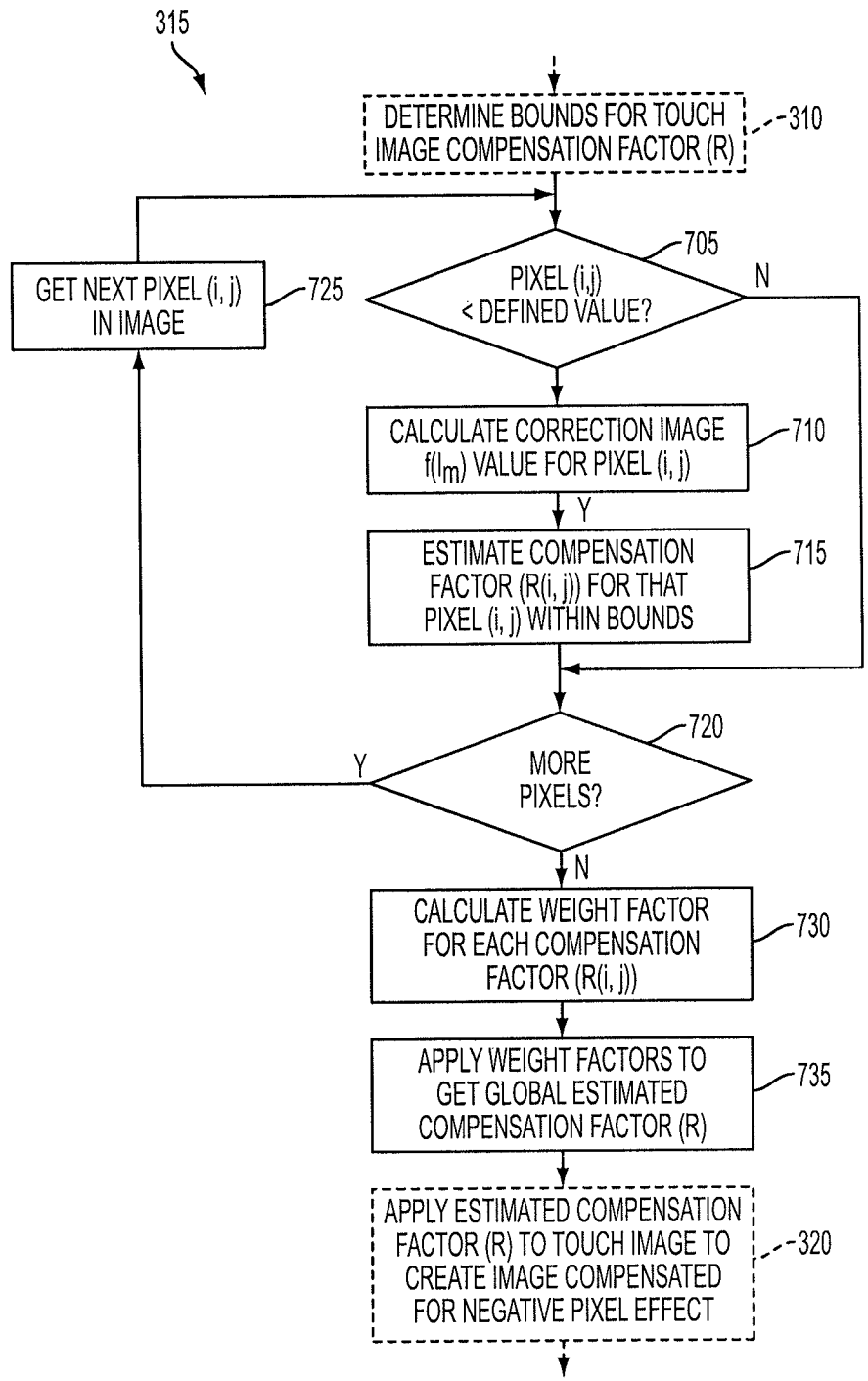
FIG. 7 illustrates an exemplary estimation of a compensation factor that can be included in an exemplary method for compensating for negative pixel effect in a touch sensor panel according to various embodiments.

FIG. 7 illustrates an exemplary estimation of a compensation factor that can be included in an exemplary method for compensating for negative pixel effect in a touch sensor panel according to various embodiments. Negative pixels in the measured touch image Im can be adjusted to zero or substantially close to zero to compensate for negative pixel effect. Positive pixels in the measured touch image Im can be adjusted, e.g., boosted to be more positive, to compensate for negative pixel effect. A negative pixel compensation factor R can be estimated that can successfully make this adjustment. Since negative pixels can generally provide the most information needed to estimate the factor R, the negative pixels in the measured image Im can be selected for the estimation, while the zero and positive pixels can be ignored.

In the example of FIG. 7, after the bounds of the negative pixel compensation factor R have been generated (310), the negative pixel compensation factor R within those bounds can be estimated based on the selected negative pixels in the measured image Im (315). To do so, a determination can be made whether the touch signal value of each pixel(i, j) in the measured image Im is less than a defined threshold, indicative of the likelihood that the pixel is a negative pixel (705). Generally, the more negative the measured image value for that pixel (i, j), the more likely the pixel is a negative pixel. If the measured image value is less the threshold, the pixel (i, j) can be selected as a negative pixel for estimating the negative pixel compensation factor R. A correction image f(Im) can be determined for the pixels in the measured image Im. Each correction image pixel (i, j) can be determined by summing the measured touch signals along drive (row) line i, summing the measured touch signals along sense (column) line j, and multiplying the two sums, as in Equation (2) (710). The pixel's factor R(i, j) can be estimated within the determined bounds using Equation (3) such that the original image pixel I(i, j) equals zero (715). If the estimated factor R(i, j) exceeds the bounds, the factor R(i, j) can be set to whichever of the upper or lower bound is closer. In addition or alternatively, the factor R(i, j) can be discarded as associated with an anomalous pixel. If the measured image value exceeds the threshold (710), the pixel (i, j) is less likely to be a negative pixel and can therefore be ignored. This negative pixel selection (705)-(715) can be repeated for all the pixels in the measured touch image Im (720), (725).

After negative pixel compensation factors R(i, j) have been calculated for the selected negative pixels in the measured touch image Im, a weight factor can be calculated for each factor R(i, j) in order to determine a global negative pixel compensation factor R for the entire measured image Im (730). As such, the pixels experiencing the negative pixel effect can contribute most to the global factor R. In some embodiments, the weight factor can be calculated based on the difference between the selected negative pixel value and the value zero. In some embodiments, the weight factor can be calculated as the probability that the estimated factor R(i, j) adjusts the selected negative pixel value to zero. In some embodiments, the weight factor can be calculated based on the mode of the selected negative pixel values. Other parameters for calculating the weight factor are also possible. The calculated weight factors can be applied to their corresponding negative pixel compensation factors R(i, j) to produce the global negative pixel compensation factor R (735). In some embodiments, the global factor R can be calculated as a weighted mean of the factors R(i, j). In some embodiments, the global factor R can be calculated as a median of the factors R(i, j). In some embodiments, the global factor R can be calculated as a mode of the factors R(i, j). In some embodiments, the global factor R can be calculated as a combination weighted mean and mode of the factors R(i, j). Other techniques for calculating the global factor R are also possible. The global factor R can then be applied to the measured touch image Im to restore the original image I compensated for the negative pixel effect, as in Equation (1), and the method of FIG. 3 can proceed as described above (320).

In some embodiments, in addition to or alternatively, a determination of whether a pixel (i, j) is likely a negative pixel (705) can be determined based on the correction image pixels rather than the measured image pixels. For example, each correction image pixel (i, j) can be compared to a noise threshold. In some embodiments, the noise threshold can be set based on the noise variance of each pixel in the correction image, where the correction image pixel can be calculated as the sum of the measured image pixels in that pixel's row multiplied by the sum of the measured image pixels in that pixel's column as in Equation (2), and the noise variance can be calculated based on the noise variances of each of these row and column pixels, for example. If the correction image pixel (i, j) value is at or below the noise threshold, the pixel (i, j) can be ignored as not providing sufficient information to estimate the negative pixel compensation factor.

Figure 8:
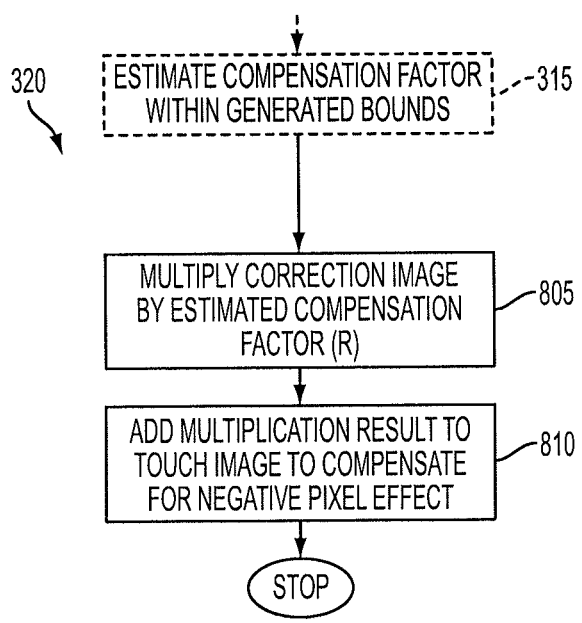
FIG. 8 illustrates an exemplary application of a compensation factor that can be included in an exemplary method for compensating for negative pixel effect in a touch sensor panel according to various embodiments.

FIG. 8 illustrates an exemplary application of a compensation factor that can be included in an exemplary method for compensating for negative pixel effect in a touch sensor panel according to various embodiments. In the example of FIG. 8, after a negative pixel compensation factor R is estimated (315), the factor R can be applied to the measured touch image Im to restore the original touch image I compensated for negative pixel effect (320). The negative pixel compensation factor R and the correction image f(Im) (as determined from Equation (3)) can be multiplied (805) and the resulting product added to the measured touch image Im, as in Equation (1), to restore the original image I as it should be absent the negative pixel effect (810). The original image I can then be used for further processing.

Negative pixel compensation can be applied when the touch sensor panel is subject to negative pixel effect and omitted when the panel is not. However, in some cases, there can be a rather quick change between having and not having the negative pixel effect. For example, the panel user can fluctuate between a grounded state, where there is no negative pixel effect, and an ungrounded state, where there is negative pixel effect. In addition or alternatively, the panel can alternate between detecting negative pixel effect and failing to detect negative pixel effect, e.g., due to the locations of touches at the panel. As such, negative pixel compensation can switch on and off, resulting in an undesirable image flicker between displaying the measured touch image or displaying the compensated touch image. Therefore, logic can be included in negative pixel compensation to selectively apply the compensation so as to prevent or reduce image flicker and/or any other conditions that can cause artificial changes between successive images.

Figure 9:
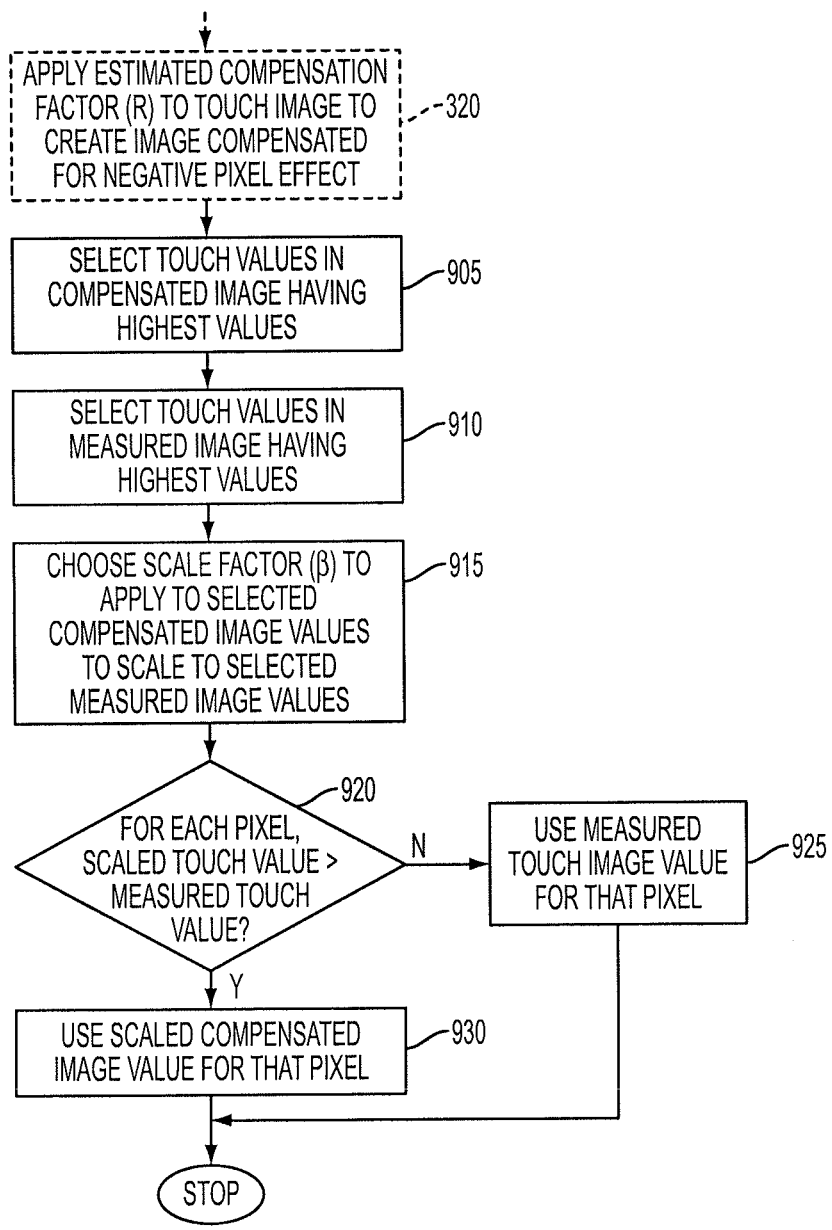
FIG. 9 illustrates an exemplary selectivity of compensation that can be included in an exemplary method for compensating for negative pixel effect in a touch sensor panel according to various embodiments.

FIG. 9 illustrates an exemplary selectivity of compensation that can be included in an exemplary method for compensating for negative pixel effect in a touch sensor panel according to various embodiments. In the example of FIG. 9, after the original touch image I compensated for negative pixel effect has been restored (320), the overall energy of the measured touch image Im can be maintained between successive images to prevent or reduce image flicker as follows. The highest values of the original touch image I compensated for negative pixel effect can be selected (905) and the highest values of the measured touch image Im can be selected (910). A scale factor β can be chosen to apply to the selected original image I values to scale them to the selected measured image Im values (915). In some embodiments, β can be taken to be about 80% to 90% of its originally calculated value, such that the highest values of the original touch image I can be scaled down to about 80% to 90% of the highest values of the measured touch image Im. The chosen scale factor β can then be applied to the entire original image I to create a scaled original touch image Ic, in which the highest values are about the same as the measured image's highest values. In some embodiments, the scale factor β can be a composite of multiple scale factors chosen to appropriately scale the original image I.

In the original image I and consequently the scaled original image Ic, the negative pixels have been compensated for so that their values will be at or near zero; whereas, the negative pixels in the measured image Im will have negative values. The positive pixels have been compensated for so that their values will be positively adjusted. As such, a determination can be made as to which pixels have been compensated by comparing the scaled original image values to the measured image values for each pixel (920). If the scaled original image value is greater than the measured image value, the pixel has been compensated for negative pixel effect and the scaled original image value should be used in the final compensated image (930). Otherwise, the pixel has not been compensated or only slightly compensated and the measured image value should be used in the final compensated image (925).

As a result, only those significantly compensated pixels can change in energy between successive images, while those pixels that are not compensated or only slightly compensated can be maintained in energy at the measured touch image values between successive images. Therefore, the overall energy of the final compensated image can be substantially unchanged from the preceding displayed image, thereby reducing or eliminating image flicker.

Figure 10:
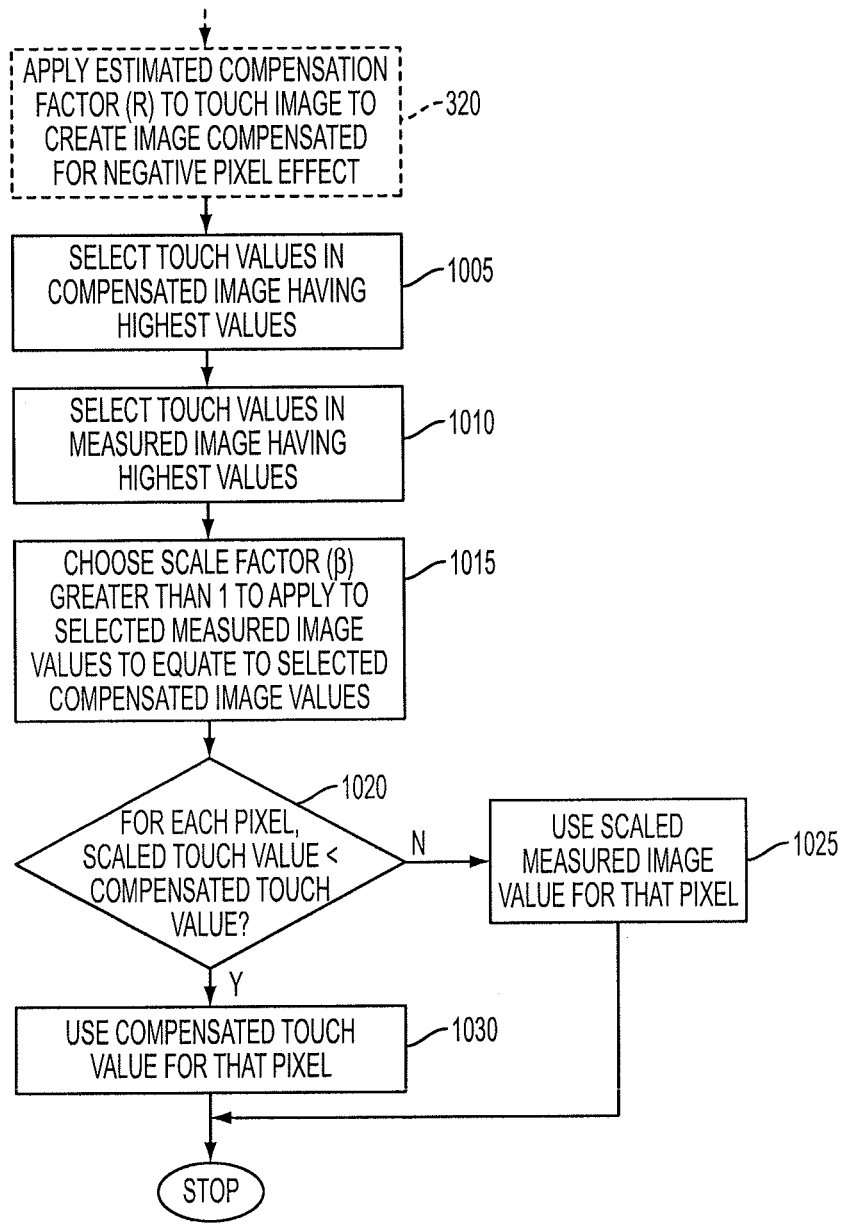
FIG. 10 illustrates another exemplary selectivity of compensation that can be included in an exemplary method for compensating for negative pixel effect in a touch sensor panel according to various embodiments.

FIG. 10 illustrates another exemplary selectivity of compensation that can be included in an exemplary method for compensating for negative pixel effect in a touch sensor panel according to various embodiments. In the example of FIG. 10, after the original touch image I compensated for negative pixel effect has been restored (320), the intensity of the measured touch image Im can be scaled to that of the original touch image I between successive images to prevent or reduce image flicker as follows. The highest values of the original touch image I compensated for negative pixel effect can be selected (1005) and the highest values of the measured touch image Im can be selected (1010). A scale factor β greater than 1 can be chosen to apply to the selected measured image Im values to scale them to the selected original image I values (1015). β can be 1.0 and above. The chosen scale factor β can then be applied to the entire measured image Im to create a scaled measured touch image Imc, in which the highest values are about the same as the original image's highest values.

In the original image I, the negative pixels have been compensated for so that their values will be at or near zero; whereas, the negative pixels in the measured image Im and consequently the scaled measured image Imc will have negative values. The positive pixels have been compensated for so that their values will be positively adjusted. As such, a determination can be made as to which pixels have been compensated by comparing the scaled measured image values to the original image values for each pixel (1020). If the scaled measured image value is less than the original image value, the pixel has been compensated for negative pixel effect and the original image value should be used in the final compensated image (1030). Otherwise, the pixel has not been compensated or only slightly compensated and the scaled measured image value should be used in the final compensated image (1025).

As a result, only those significantly compensated pixels can change in intensity between successive images, while those pixels that are not compensated or only slightly compensated can have little or no change in intensity between successive images. In cases where there is a small change in intensity for the pixels not compensated or only slightly compensated, some measures can be taken to smooth the change so as to avoid a small amount of image flicker.

It is to be understood that a method of compensating for negative pixel effect is not limited to those illustrated in FIGS. 3 through 10, but can include other and/or additional actions capable of negative pixel compensation according to various embodiments.

Figure 11:
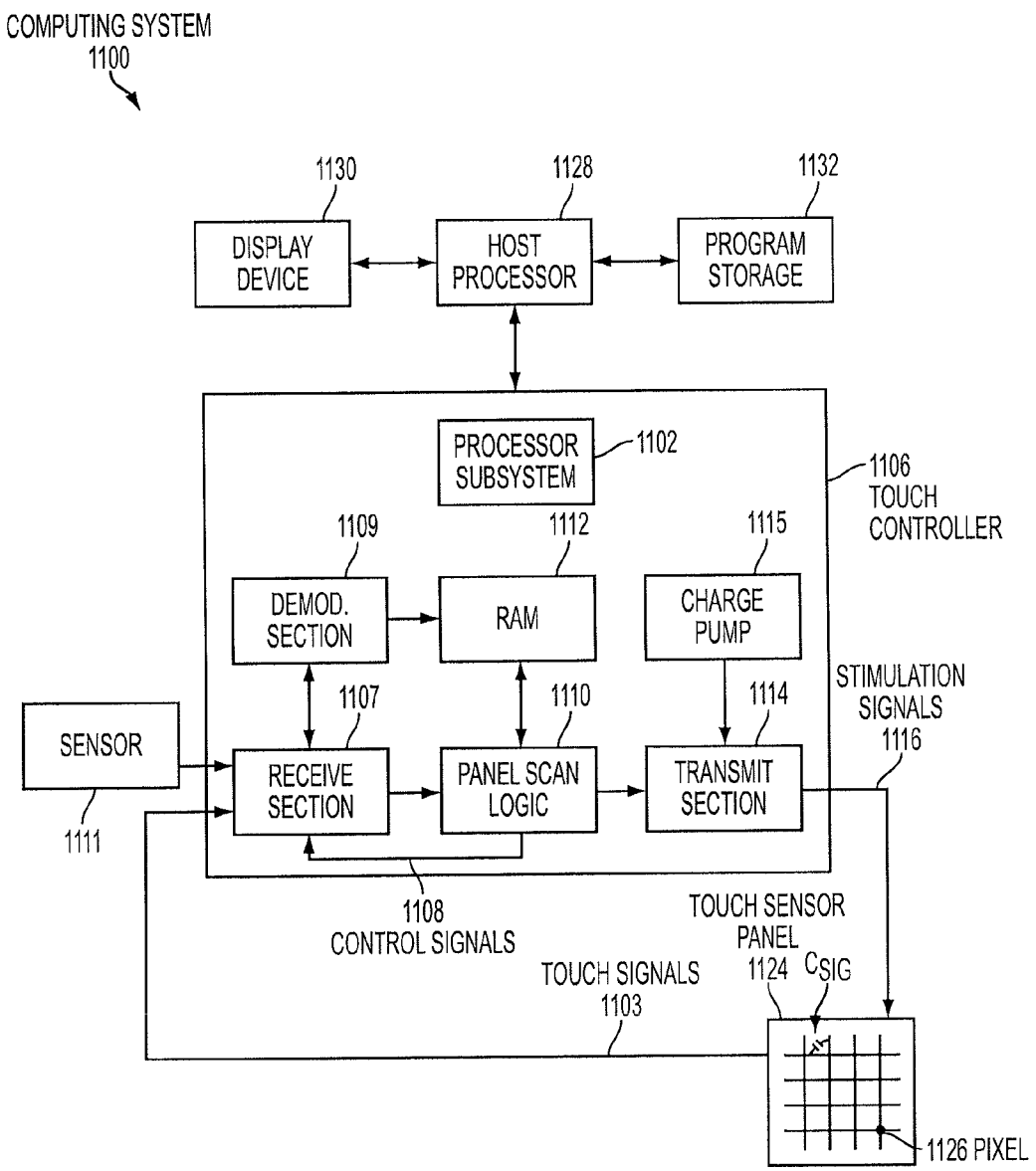
FIG. 11 illustrates an exemplary computing system that can compensate for negative pixel effect according to various embodiments.

FIG. 11 illustrates an exemplary computing system 1100 that can compensate for a negative pixel effect in a touch sensor panel according to various embodiments described herein. In the example of FIG. 11, computing system 1100 can include touch controller 1106. The touch controller 1106 can be a single application specific integrated circuit (ASIC) that can include one or more processor subsystems 1102, which can include one or more main processors, such as ARM968 processors or other processors with similar functionality and capabilities. However, in other embodiments, the processor functionality can be implemented instead by dedicated logic, such as a state machine. The processor subsystems 1102 can also include peripherals (not shown) such as random access memory (RAM) or other types of memory or storage, watchdog timers and the like. The touch controller 1106 can also include receive section 1107 for receiving signals, such as touch signals 1103 of one or more sense channels (not shown), other signals from other sensors such as sensor 1111, etc. The touch controller 1106 can also include demodulation section 1109 such as a multistage vector demodulation engine, panel scan logic 1110, and transmit section 1114 for transmitting stimulation signals 1116 to touch sensor panel 1124 to drive the panel. The panel scan logic 1110 can access RAM 1112, autonomously read data from the sense channels, and provide control for the sense channels. In addition, the panel scan logic 1110 can control the transmit section 1114 to generate the stimulation signals 1116 at various frequencies and phases that can be selectively applied to rows of the touch sensor panel 1124.

The touch controller 1106 can also include charge pump 1115, which can be used to generate the supply voltage for the transmit section 1114. The stimulation signals 1116 can have amplitudes higher than the maximum voltage by cascading two charge store devices, e.g., capacitors, together to form the charge pump 1115. Therefore, the stimulus voltage can be higher (e.g., 6V) than the voltage level a single capacitor can handle (e.g., 3.6V). Although FIG. 11 shows the charge pump 1115 separate from the transmit section 1114, the charge pump can be part of the transmit section.

Computing system 1100 can also include touch sensor panel 1124, which can be as described above in FIG. 1, for example.

Computing system 1100 can include host processor 1128 for receiving outputs from the processor subsystems 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1128 can also perform additional functions that may not be related to panel processing, and can be coupled to program storage 1132 and display device 1130 such as an LCD display for providing a UI to a user of the device. In some embodiments, the host processor 1128 can be a separate component from the touch controller 1106, as shown. In other embodiments, the host processor 1128 can be included as part of the touch controller 1106. In still other embodiments, the functions of the host processor 1128 can be performed by the processor subsystem 1102 and/or distributed among other components of the touch controller 1106. The display device 1130 together with the touch sensor panel 1124, when located partially or entirely under the touch sensor panel or when integrated with the touch sensor panel, can form a touch sensitive device such as a touch screen.

Note that negative pixel compensation, as well as one or more of the functions described above, can be performed, for example, by firmware stored in memory (e.g., one of the peripherals) and executed by the processor subsystem 1102, or stored in the program storage 1132 and executed by the host processor 1128. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 11, but can be a proximity panel or any other panel according to various embodiments. In addition, the touch sensor panel described herein can be a multi-touch sensor panel.

It is further to be understood that the computing system is not limited to the components and configuration of FIG. 11, but can include other and/or additional components in various configurations capable of compensating for negative pixel effect according to various embodiments.

Figure 12:
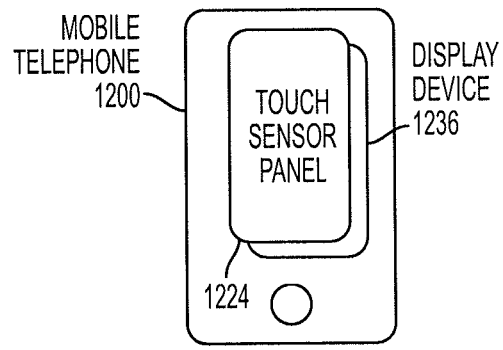
FIG. 12 illustrates an exemplary mobile telephone that can compensate for negative pixel effect according to various embodiments.

FIG. 12 illustrates an exemplary mobile telephone 1200 that can include touch sensor panel 1224, display 1236, and other computing system blocks that can perform negative pixel compensation according to various embodiments.

Figure 13:
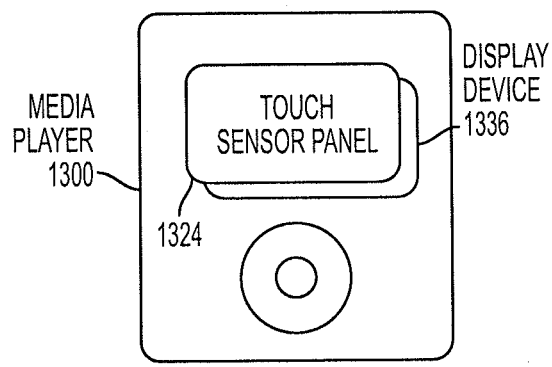
FIG. 13 illustrates an exemplary digital media player that can compensate for negative pixel effect according to various embodiments.

FIG. 13 illustrates an exemplary digital media player 1300 that can include touch sensor panel 1324, display 1336, and other computing system blocks that can perform negative pixel compensation according to various embodiments.

Figure 14:
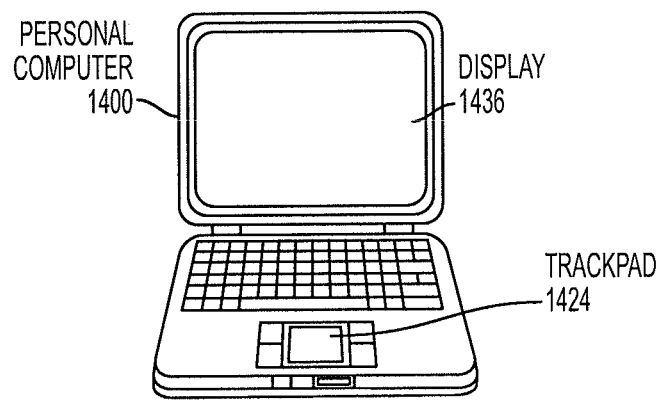
FIG. 14 illustrates an exemplary personal computer that can compensate for negative pixel effect according to various embodiments.

FIG. 14 illustrates an exemplary personal computer 1400 that can include touch sensor panel (trackpad) 1424, display 1436, and other computing system blocks that can perform negative pixel compensation according to various embodiments.

The mobile telephone, media player, and personal computer of FIGS. 12 through 14 can realize power savings, improved accuracy, faster speed, and more robustness by compensating for a negative pixel effect according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for compensating an acquired touch image for a negative pixel effect, the method comprising:
   determining at least one bound for a compensation factor based on one or more acquired touch image values, wherein the one or more touch image values represent data acquired from a touch sensor panel;
   estimating the compensation factor within the determined bound based on the touch image values of the one or more touch image values that are negative, wherein the negative touch image values are indicative of a grounding condition of a user or object touching or in close proximity to a touch sensor panel and wherein the estimated compensation factor is a function of an estimated touch and grounding condition of a user or object touching or in close proximity to the touch sensor panel; and
   applying the estimated compensation factor to the one or more touch image values.

2. The method of claim 1, wherein determining the at least one bound comprises:
   determining an upper bound for the compensation factor based on at least one of a maximum attainable touch image value or a sum of expected touch image values; and
   determining a lower bound for the compensation factor to be about zero.

3. The method of claim 1, wherein estimating the compensation factor comprises:
   estimating a compensation factor for each negative touch image value;
   calculating a weight factor for each estimated compensation factor; and
   applying the calculated weight factors to the corresponding estimated compensation factors to produce the compensation factor within the determined bound.

4. The method of claim 3, wherein calculating the weight factor comprises:
   calculating a difference between the corresponding negative touch image value and zero; and
   associating the weight factor with the calculated difference.

5. The method of claim 1, wherein applying the estimated compensation factor comprises:
   calculating correction image values indicative of correction to be made to the touch image values; and
   adding a product of the estimated compensation factor and the calculated correction image values to the touch image values.

6. The method of claim 1, comprising subtracting noise bias from the touch image values.

7. The method of claim 1, comprising applying a scale factor to at least one of the touch image values or the compensated touch image values for image consistency.

8. A touch sensitive device comprising:
   a touch sensor panel comprising multiple touch locations for sensing a touch on the panel; and
   a processor in communication with the panel and configured to
   capture an image of the sensed touch wherein the image of the sensed touch includes one or touch image values,
   identify negative values of the one or more touch image values in the captured image,
   determine a bound of a compensation factor based on the identified negative values for adjusting the captured image,
   estimate the compensation factor within the determined bound based on the touch image values of the one or more touch image values that are negative, wherein the negative touch image values are indicative of a grounding condition of a user or object touching or in close proximity to a touch sensor panel and wherein the estimated compensation factor is a function of an estimated touch and grounding condition of a user or object touching or in close proximity to the touch sensor panel; and
   adjust the identified negative values to about zero using the estimated compensation factor.

9. The device of claim 8, wherein adjusting the identified negative values is based on a linear relationship between the captured image and the compensation factor.

10. The device of claim 8 incorporated into at least one of a mobile telephone, a digital media player, or a personal computer.

11. A non-transitory computer readable storage medium having stored thereon a set of instructions for compensating for a negative pixel effect in a touch sensor panel, that when executed by a processor causes the processor to:
   determine a bound for a compensation factor based on one or more values of a touch image captured by the panel wherein the one or more touch image values represent data acquired from the touch sensor panel;
   estimate the compensation factor within the determined bound based on the touch image values of the one or more touch image values that are negative, wherein the negative touch image values are indicative of a grounding condition of a user or object touching or in close proximity to a touch sensor panel and wherein the estimated compensation factor is a function of an estimated touch and grounding condition of a user or object touching or in close proximity to the touch sensor panel; and
   apply the estimated compensation factor to the one or more touch image values to compensate for the negative pixel effect.

12. The medium of claim 11, wherein the processor applies the estimated compensation factor to the negative touch image values to set the negative touch image values to about zero.

13. The medium of claim 11, wherein the processor applies the estimated compensation factor to the touch image values that are positive to boost the positive touch image values in a positive direction.

* * * * *